(12) United States Patent
Orlov et al.

(10) Patent No.: US 8,356,960 B2
(45) Date of Patent: Jan. 22, 2013

(54) CUTTING TOOL AND CUTTING INSERT THEREFOR

(75) Inventors: Alexander Orlov, Nahariya (IL); Danny Chen, Nahariya (IL)

(73) Assignee: Iscar, Ltd., Tefen (IL)

( * ) Notice: Subject to any disclaimer, the term of this patent is extended or adjusted under 35 U.S.C. 154(b) by 759 days.

(21) Appl. No.: 12/579,466

(22) Filed: Oct. 15, 2009

(65) Prior Publication Data
US 2010/0104384 A1    Apr. 29, 2010

(30) Foreign Application Priority Data
Oct. 26, 2008   (IL) ................................ 194924

(51) Int. Cl.
*B23B 27/16* (2006.01)
*B23C 5/22* (2006.01)
(52) U.S. Cl. .................................. 407/103; 407/113
(58) Field of Classification Search .......... 407/103, 407/104, 105, 40, 41, 113, 114, 115, 116
See application file for complete search history.

(56) References Cited

U.S. PATENT DOCUMENTS

| | | | | |
|---|---|---|---|---|
| 6,142,716 A * | 11/2000 | Jordberg et al. | | 407/114 |
| 6,155,754 A * | 12/2000 | Jonsson | | 407/103 |
| 6,960,049 B2 * | 11/2005 | Inayama | | 407/103 |
| 7,144,205 B2 * | 12/2006 | Sheffler et al. | | 407/103 |
| 7,255,518 B2 * | 8/2007 | Wallstrom et al. | | 407/103 |
| 7,347,650 B2 * | 3/2008 | Tipu | | 407/105 |
| 7,537,419 B2 * | 5/2009 | Sjoberg et al. | | 407/103 |
| 2004/0101371 A1 * | 5/2004 | Arvidsson et al. | | 407/48 |
| 2008/0240873 A1 * | 10/2008 | Furuki | | 407/107 |

FOREIGN PATENT DOCUMENTS

| | | |
|---|---|---|
| DE | 3405211 | 8/1985 |
| EP | 1736263 | 12/2006 |
| IL | 144154 | 1/2006 |
| IL | 144855 | 1/2006 |
| JP | 2000254806 | 9/2000 |
| JP | 2005262329 | 9/2005 |
| WO | 9626802 | 6/1996 |
| WO | WO 02/055245 | 7/2002 |

OTHER PUBLICATIONS

Official Action dated Nov. 20, 2011 issued in counterpart Israeli application (No. 194924).
International Search Report dated Feb. 15, 2010 issued in corresponding International Application No. PCT/IL2009/000979.

* cited by examiner

*Primary Examiner* — Will Fridie, Jr.
(74) *Attorney, Agent, or Firm* — Womble Carlyle (57) ABSTRACT

A cutting tool includes at least one cutting portion, having an insert pocket, releasably retaining a single-sided cutting insert therein. The cutting portion has a tangential screwing element to clamp the cutting insert in the insert pocket. The screwing element, which comprises a screw, allows releasing and clamping of the cutting insert without having to completely remove the screwing element from the insert pocket. The cutting insert has a top surface, a bottom surface and a peripheral side surface; a recess is formed in the bottom surface. The screwing element is inserted into the recess via the bottom surface. Upon fastening of the screw, a protruding portion of the screwing element clamps the cutting insert in its insert pocket. The cutting insert and protruding portion may have respective geometries allowing them to abut one another at at least two distinct abutment sub-regions.

17 Claims, 7 Drawing Sheets

CUTTING TOOL AND CUTTING INSERT THEREFOR

FIELD OF THE INVENTION

The present invention relates to cutting inserts, and to arrangements of securing the cutting inserts to cutting tools.

BACKGROUND OF THE INVENTION

There are known many different ways and arrangements for securing a cutting insert, such as a releasable cutting insert, in an insert pocket of a cutting tool.

These arrangements usually involve a clamping element, such as a clamping screw, which is inserted in a through bore of the cutting insert and screwably received into a threaded bore formed in the insert pocket.

In some applications of rotating cutting tools, the cutting insert is clamped in the insert pocket "radially", i.e., such that the longitudinal axis of the clamping screw is generally perpendicular to a radial plane which is parallel to, and which extends through, the axis of rotation of the cutting tool.

In other applications of rotating cutting tools, the cutting insert is clamped in the insert pocket "tangentially", i.e., such that the longitudinal axis of the clamping screw is generally parallel to a plane perpendicular to the axis of rotation and parallel to a radial plane which is parallel to, and which extends through, the axis of rotation of the cutting tool.

A cutting tool having multiple radially clamped cutting inserts requires the cutting inserts to be sufficiently spaced apart, to allow enough room for removing and inserting the respective clamping screws, from and in the cutting inserts, respectively. This relatively limits the possible number of radially clamped cutting inserts in a single cutting tool, which may potentially limit the performance of the cutting tool. Cutting inserts tangentially clamped are relatively thick in the circumferential direction. Therefore, the possible number of tangentially clamped cutting inserts in a single cutting tool is also relatively limited, which may similarly limit the cutting tool in performance.

For example, a milling tool having a diameter of 80 millimeters may be limited to have at most seven cutting inserts, whereas a milling tool having a diameter of 100 millimeters may be limited to have at most eight cutting inserts.

Additionally, for cutting tools having either radially or tangentially clamped cutting inserts, replacement of a cutting insert may require the complete removal of the clamping screw from its insert pocket. Thus, the replacement procedure may be time consuming and cumbersome, especially if the cutting tool has a relatively high number of cutting inserts.

In addition, clamping mechanisms of some cutting tools, for example, of cutting tools having tangentially clamped cutting inserts, may include components that are only able to withstand a low exertion of pressure thereon. These components may include clamping pins or screw-heads that are limited in strength or performance, for example, due to the geometry of the inserts and/or of the clamping mechanisms involved.

SUMMARY OF THE INVENTION

According to some embodiments of the present invention, a cutting tool includes at least one cutting portion, the at least one cutting portion includes an insert pocket with a single-sided cutting insert releasably retained therein. The cutting insert includes a bottom surface, a top surface, and a peripheral side surface extending therebetween, the peripheral side surface includes two opposing major side surfaces and two opposing minor side surfaces. In accordance with the present invention, the top surface of the single-sided cutting insert includes at least one cutting edge and an associated rake surface. Adjacent the at least one cutting edge in the peripheral side surface is a relief surface. The bottom surface is provided with a recess which is shaped to receive, via the bottom surface, a screwing element. The screwing element includes a base portion screwably received in a threaded bore formed in a major side wall of the insert pocket, the major side wall being in abutment with one of the major side surfaces. The recess includes a shaped hole which forms two facing inner surfaces; the facing inner surfaces serve as abutment regions within the cutting insert. In the assembled tool, the screwing element applies a fastening force against at least one of the abutment regions. In some embodiments, the screwing element has a protruding portion extending into the recess and the shaped hole accommodates therein an attachment surface of the protruding portion. The attachment surface abuts one of the abutment regions, each of which may comprise two or more spaced apart abutment sub-regions. The shaped hole may extend to, and may open to the top surface, to form an aperture therein.

According to some embodiments of the present invention, the recess includes a groove extending between the two major side surfaces, and along the bottom surface, to accommodate therein at least a portion of the base portion; and the shaped hole extends from the groove toward the top surface.

According to some embodiments of the present invention, in a top view of the cutting insert, the shaped hole has an elongated shape. In some embodiments, a longitudinal median plane of the shaped hole forms a first non-zero acute angle with the longitudinal median plane of the cutting insert; and the longitudinal median plane of the shaped hole forms a second non-zero acute angle with the inner surfaces.

BRIEF DESCRIPTION OF THE DRAWINGS

For a better understanding of the present invention and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Although some drawings herein show a rotating cutting tool, e.g., a milling tool, the present invention is not limited in this respect. For example, some embodiments of the invention may refer to other cutting tools, having one or more releasable cutting inserts retained therein, including various rotating tools such as drilling tools, turning tools, or any metal cutting tool having one or more releasable cutting inserts retained therein.

Figure 1:
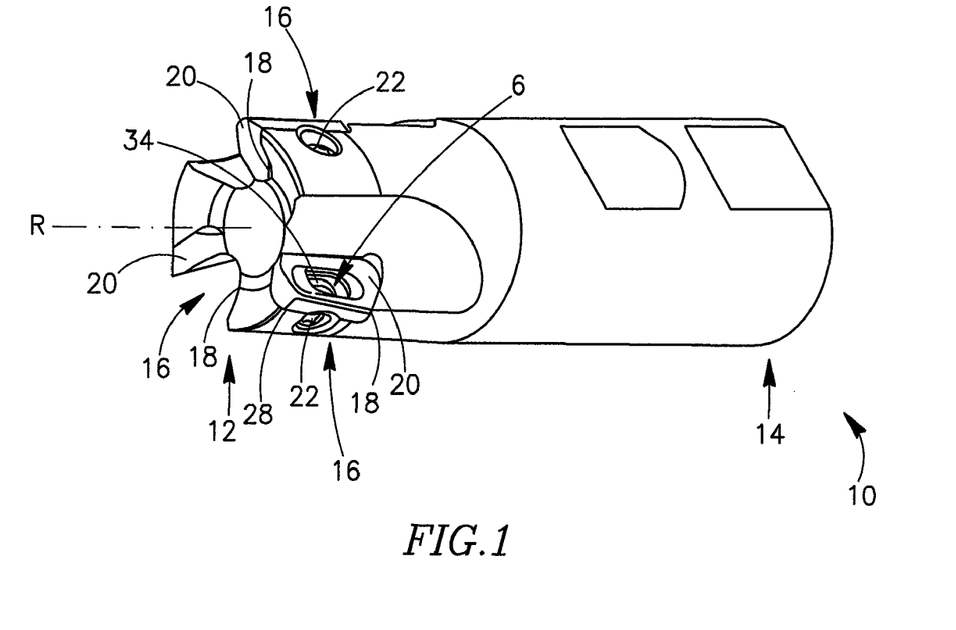
FIG. 1 is a perspective view of a cutting tool according to embodiments of the present invention.
Figure 2:
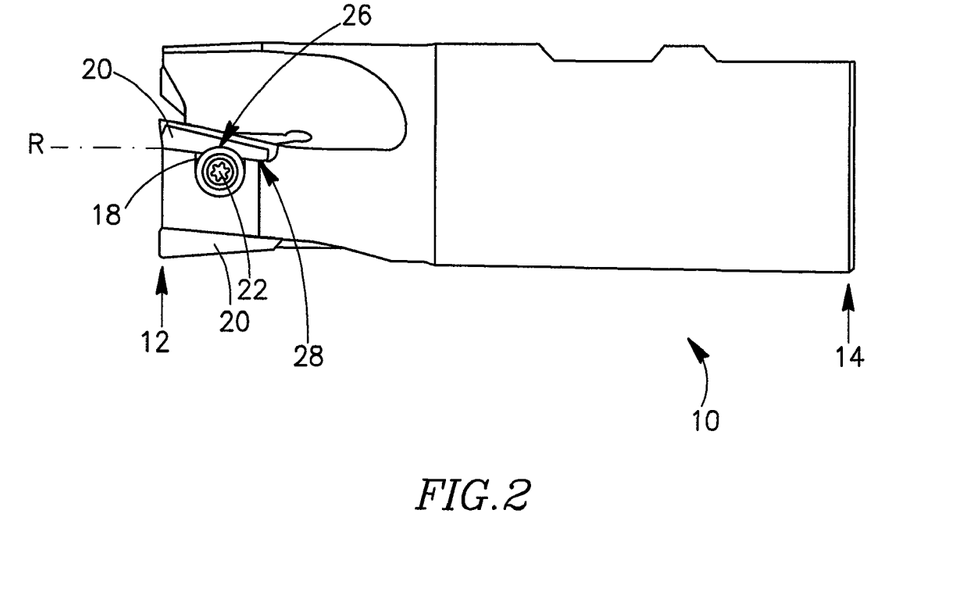
FIG. 2 is a side view of the cutting tool according to embodiments of the present invention.

Reference is now made to FIGS. 1 and 2, showing a cutting tool 10 according to some embodiments of the present invention. The cutting tool 10 has a front end 12, a rear end 14, and a rotation axis R. The cutting tool 10 includes one or more cutting portions 16, wherein each cutting portion 16 includes an insert pocket 18, releasably retaining therein a cutting insert 20.

The cutting portion 16 includes a screwing element 22, described in detail below, to fasten the cutting insert 20 in the insert pocket 18. The cutting insert 20 is fastened in the insert pocket 18 tangentially so that a longitudinal axis of the screwing element 22 is generally parallel to a plane perpendicular to the rotation axis R, or forms a small angle therewith. The longitudinal axis of the screwing element 22 is also generally parallel to a radial plane which is parallel to, and which extends through, the rotation axis R; or alternatively forms a small angle therewith.

In some embodiments, the cutting insert 20 is positioned in the insert pocket 18, e.g., the cutting insert 20 is surmounted on the screwing element 22, to abut a top region 24 thereof. In this position, a protruding portion 34 described in detail below, and/or other portions of the screwing element 22 are inserted, respectively, in one or more complementary shaped portions of a recess 26 formed at least on a bottom surface 28 of the cutting insert 20, e.g., as described in detail below. This tangential clamping allows a finer pitch of the cutting tool 10, i.e., allows a relatively close spacing of the cutting inserts 20 in the cutting tool 10. For example, the cutting tool 10 may have ten cutting inserts 20, e.g., if the cutting tool 10 is a milling tool having a diameter of 80 millimeters, or have thirteen cutting inserts 20, e.g., if the cutting tool 10 has a diameter of 100 millimeters.

Figure 3A:
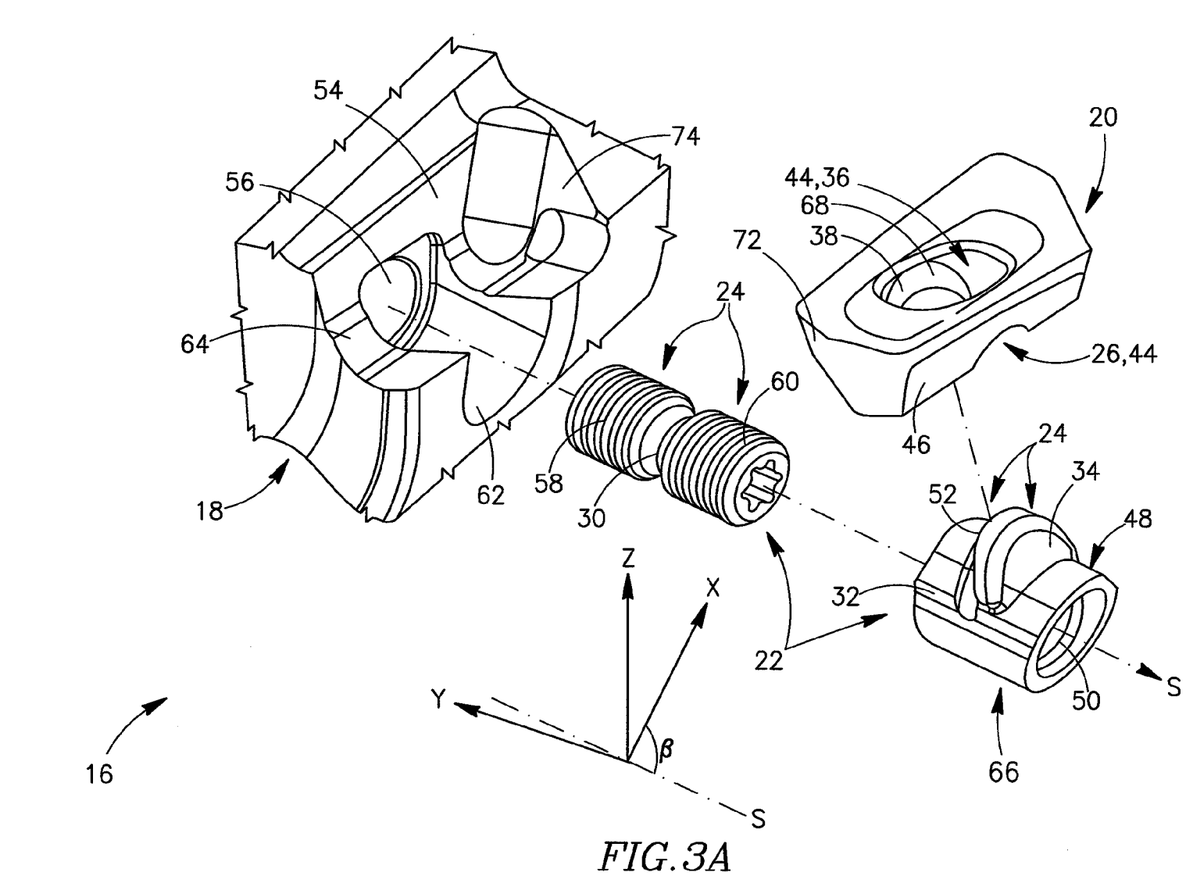
FIG. 3A is an exploded view of a cutting portion of the cutting tool, according to embodiments of the present invention.

In some non-limiting embodiments, and as described in more detail below, e.g., with reference to FIGS. 3A-4, the screwing element 22 includes a differential screw 30 and a sleeve 32 mounted thereon (e.g., as illustrated in FIG. 3A), the sleeve 32 having a protruding portion 34 inserted into a shaped hole 36 of the recess 26. Upon fastening of the differential screw 30, the protruding portion 34 is clamped against one of two facing inner surfaces 38 of the cutting insert 20, formed by the shaped hole 36. The abutting inner surface 38 thereby clamps the cutting insert 20 in the insert pocket 18.

Figure 5A:
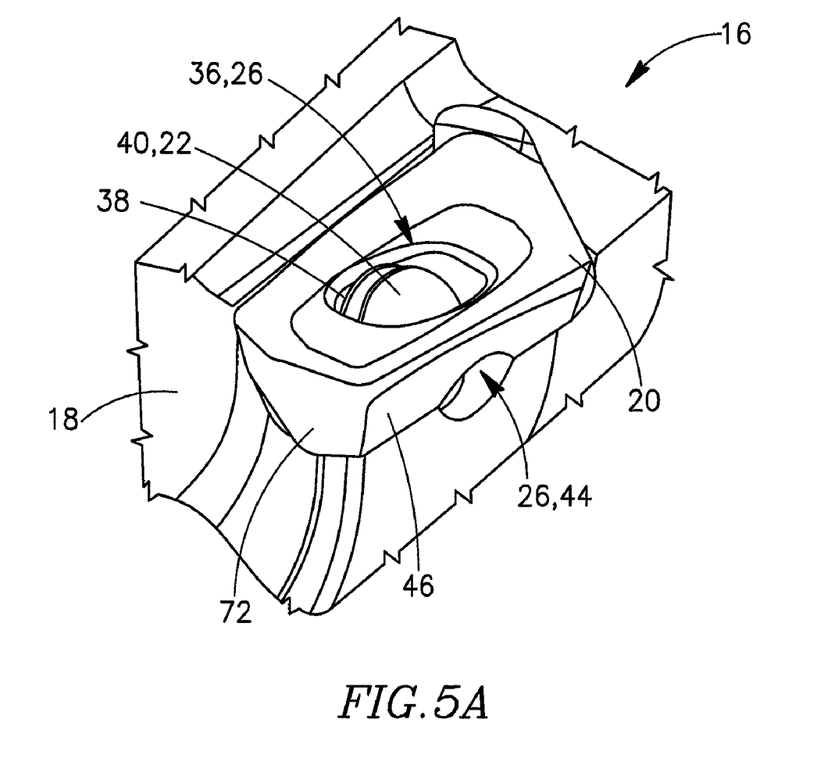
FIG. 5A is a perspective view of a cutting portion of the cutting tool, according to other embodiments of the present invention.
Figure 5B:
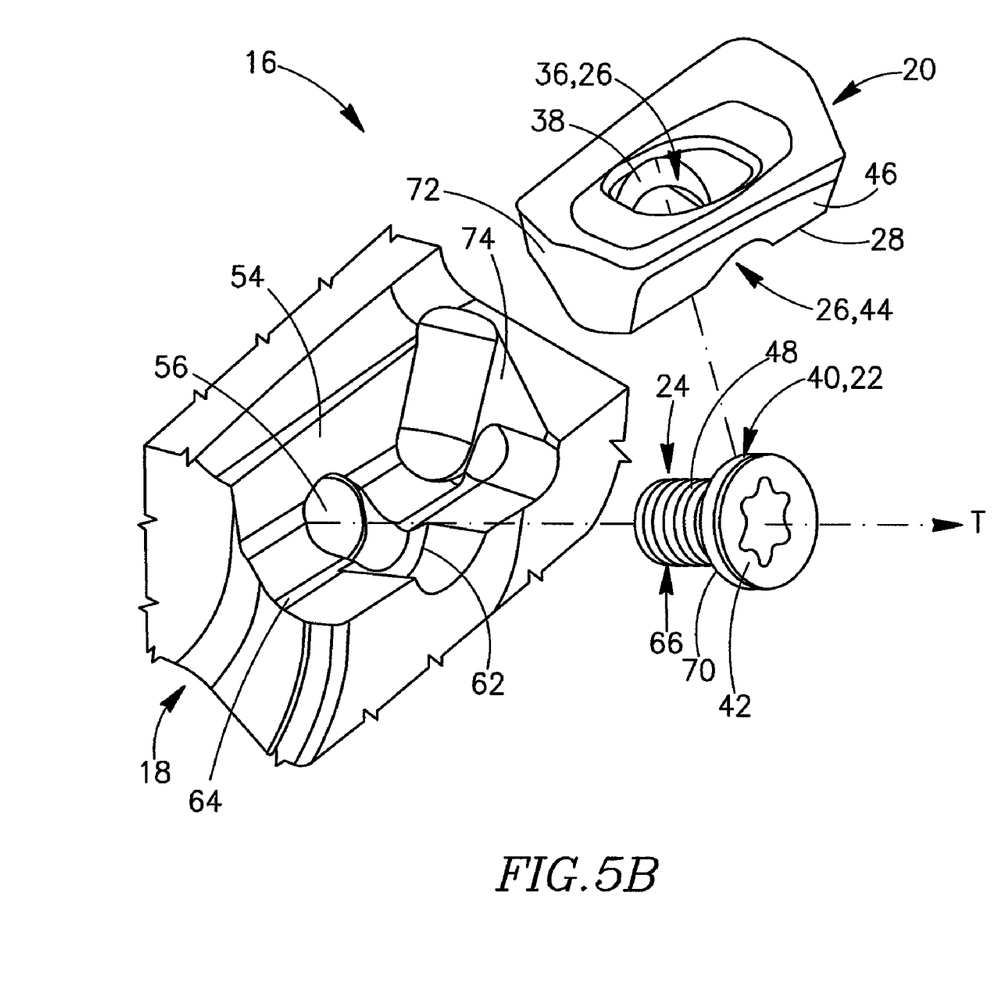
FIG. 5B is an exploded view of the cutting portion of FIG. 5A, according to some of the other embodiments of the present invention.

In other non-limiting embodiments, e.g., with reference to FIGS. 5A-5B, the screwing element 22 alternatively includes other components, e.g., a clamping screw 40. Upon positioning of the cutting insert 20 in the insert pocket 18, a portion of a screw-head 42 of the clamping screw 40 is inserted into the recess 26, so that the screw-head 42 abuts the inner surface. Thus, as the clamping-screw 40 is fastened, it clamps the cutting insert 20 in the insert pocket 18, e.g., as described in more detail below.

In some embodiments, the replacement or indexing of the cutting insert 20 may include, for example, the steps of loosening, or partially opening the screwing element 22 to a limited predefined extent, which allows the removing and/or inserting of the cutting insert 20 from the insert pocket 18 without completely removing the screwing element 22 from the insert pocket 18. Thus, for example, the replacing of the cutting insert 20 may thereby be performed with relatively little effort, and within a relatively short period of time.

Figure 3B:
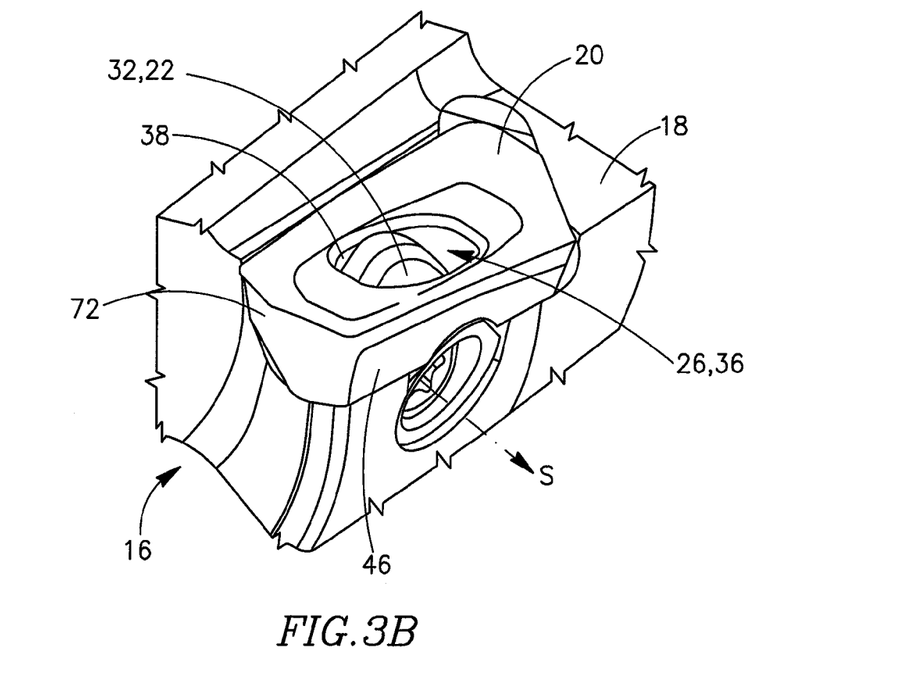
FIG. 3B is a perspective view of the cutting portion according to FIG. 3A, according to some embodiments of the present invention.
Figure 3C:
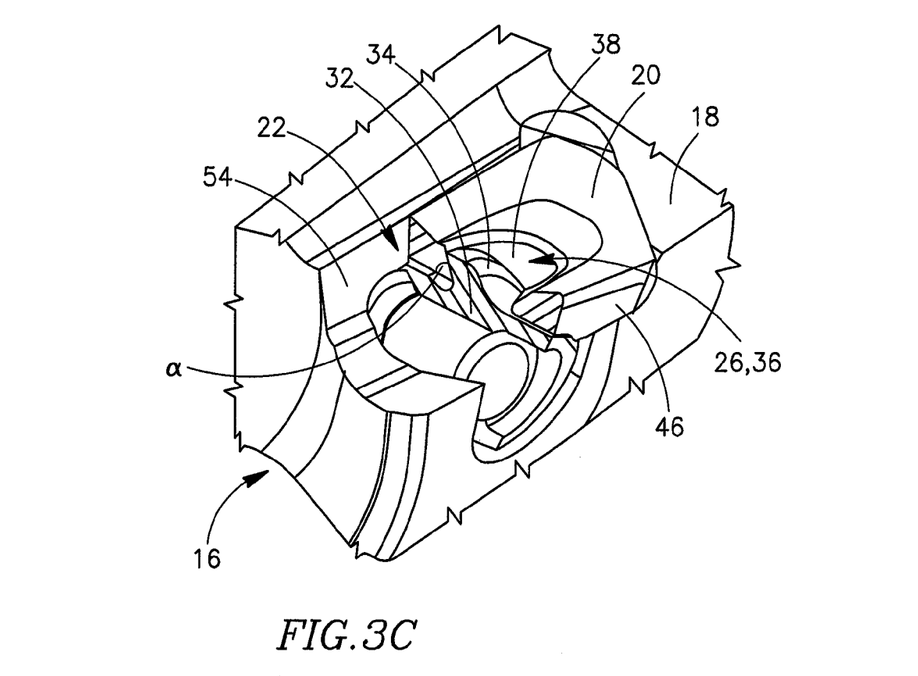
FIG. 3C is the perspective view of the cutting portion of FIG. 3A, including a cutting insert and a sleeve, wherein the cutting insert and sleeve are partially cut away.
Figure 4:
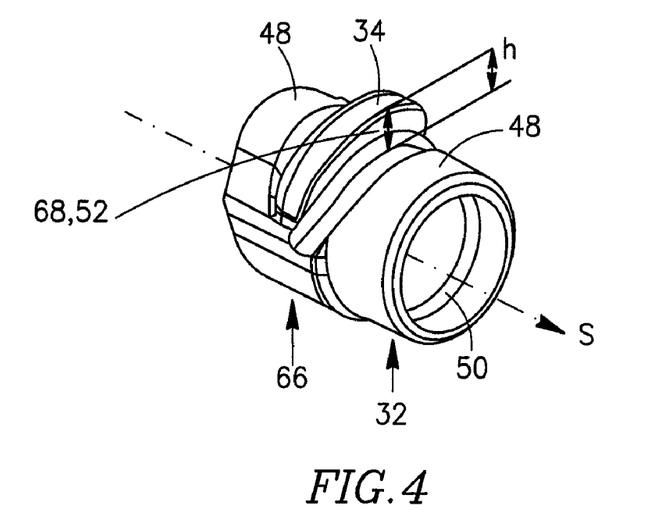
FIG. 4 is a perspective view of a sleeve of the cutting portion of FIGS. 3A-C, according to embodiments of the present invention.
Figure 6:
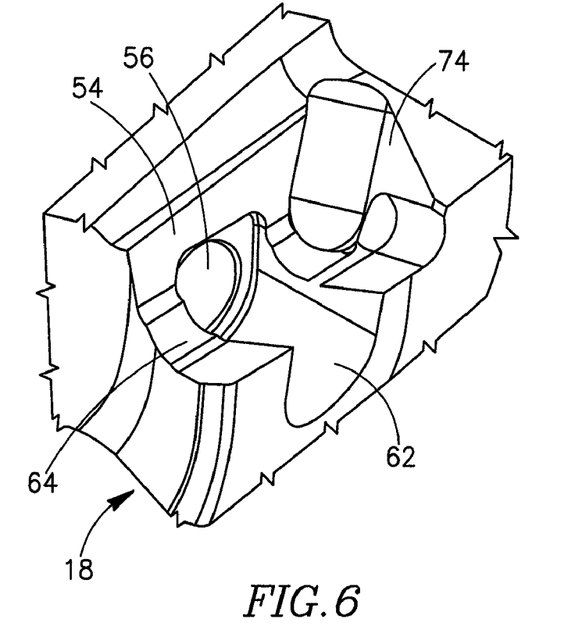
FIG. 6 is a perspective view of an insert pocket according to embodiments of the present invention.
Figure 7A:
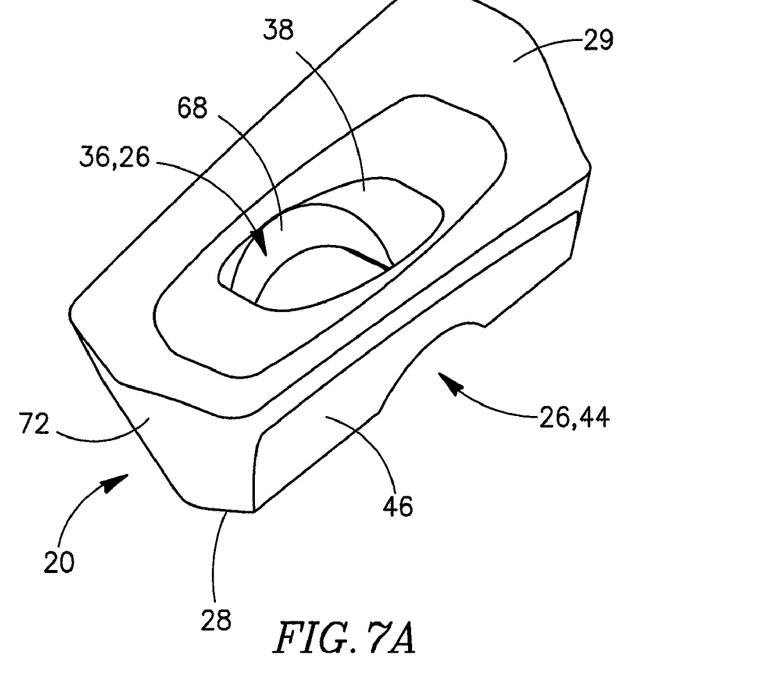
FIG. 7A is a perspective view of a cutting insert according to embodiments of the present invention.

Reference is now made to FIG. 3A-4, which show the cutting portion 16 according to some embodiments of the invention; to FIGS. 5A and 5B, which show the cutting portion 16 according to other embodiments of the invention; and to FIGS. 6 and 7A, which show perspective views of the insert pocket 18 and cutting insert 20, respectively, according to embodiments of the invention.

For clarity of description, a right-hand Cartesian coordinate system is introduced and illustrated in FIG. 3A. The coordinate system refers to descriptions accompanying FIGS. 3A-7A. In the coordinate system, the X-axis is defined to be perpendicular to a lateral median plane M of the cutting insert 20, the lateral median plane M illustrated and defined in more detail below, with reference to FIG. 7B-7D. The positive direction of the X-axis is defined in the general 'front end 12 to rear end 14' direction. The Y-axis of the coordinate system is defined to be perpendicular to a longitudinal median plane L of the cutting insert 20, the longitudinal median plane L illustrated and defined in more detail below, with reference to FIG. 7A. The positive direction of the Y-axis is defined in the general inward radial direction. A positive direction of the Z-axis completes a right-hand Cartesian coordinate system with the positive X-axis and the positive Y-axis. As seen in FIGS. 7C and 7D, first inner surface 38A comprises an associated first abutment region 68A which is at least substantially on a first side of the longitudinal median plane L and has an associated major side surface 46A. Meanwhile, second inner surface 38B comprises an associated second abutment region 68B which is at least substantially on an opposite second side of the longitudinal median plane L and also has an associated, opposing major side surface 46B. As also seen in these figures, the first and second abutment regions 68A, 68B face in opposite directions and are spaced apart from one another by non-abutment regions 69A, 69B found in the shaped hole 36.

In some embodiments, one or more portions of the recess 26 accommodate, respectively, one or more portions of the screwing element 22. For example, a groove 44 of the recess 26 may be formed at at least the bottom surface 28 and extend between two opposing major side surfaces 46. The groove is complementary in shape to, and accommodates therein, a top region 24 of a base portion 48 of the screwing element 22. Similarly, the shaped hole 36 of the recess 26 may accommodate therein the protruding portion 34 extending from the sleeve 32, or the screw-head 42 of the clamping screw 40, e.g., as described in more detail below.

The sleeve 32 may have a generally cylindrical shape, or other convenient shapes, and is hollow along a longitudinal axis thereof. The sleeve 32 has an inner thread 50, for receiving a threaded member such as screw 30 therein. The protruding portion 34 protrudes from the sleeve 32 and has a protrusion height h. The protruding portion 34 may have, for example, a substantial half-disc shape, or other convenient shapes to allow abutment of an attachment surface 52 of the protruding portion 34 with one of the two facing inner surfaces 38 of the cutting insert 20, formed by the shaped hole 36.

In some embodiments, a major side wall 54 of the insert pocket 18 includes a threaded bore 56 to allow receiving of the screw 30 therein. The screw 30 may be a differential screw 30 and have a first thread 58 and a second thread 60, for example, having opposite threading directions, to allow simultaneous receiving of the first thread 58 and the second thread 60, in the threaded bore 56 and in the inner thread 50, respectively. Thus, the fastening or loosening of the screw 30 draws the sleeve 32 and the major side wall 54 near, or apart, respectively, as the sleeve 32 slides along the longitudinal axis of the screw 30, referred to herein as the S-axis. In some embodiments, the S-axis may be on an X-Y plane defined by the X and Y axes, and have a positive direction defined from the threaded bore 56 toward the sleeve 32. The positive S-axis may form an obtuse angle with the positive X-axis, e.g., as described in detail below.

The sleeve 32 slides along a grooved portion 62, formed in a bottom wall 64 of the insert pocket 18, to accommodate therein a bottom region 66 of the screwing element 22. In some embodiments, e.g., with reference to FIG. 3A, the grooved portion 62 accommodates a bottom region 66 of the sleeve 32. In other embodiments, e.g., with reference to FIG. 5A, the grooved portion 62 accommodates the bottom portion of the clamping screw 40 that substantially performs the functionalities of the screw 30 and the sleeve 32. The grooved portion 62 may generally have the shape of a half-cylinder having a longitudinal axis coinciding with the S-axis; or the shape of a portion of a cylinder, or other convenient shapes complementary in shape to the bottom region 66 of screwing element 22 to allow sliding of screwing element 22 therein.

Upon positioning of the cutting insert 20 in the insert pocket 18 and fastening of the screw 30, the attachment surface 52 abuts the inner surface 38 along an abutment region 68, which may include two or more distinct abutment sub-regions, e.g., two abutment sub-regions, or may include a continuous abutment surface extending between the inner surface 38 and the attachment surface 52.

Similarly, in some of the other embodiments, the clamping screw 40 is received into the threaded bore 56, and has the screw-head 42 substantially performing the functionalities of the protruding portion 34. The screw-head 42 is inserted into the shaped hole 36 upon positioning of the cutting insert 20 in the insert pocket 18, and has an under face 70, substantially performing the functionalities of the attachment surface 52, abutting the inner surface.

As described in more detail below, the geometry, and direction of the median planes of the recess 26 match the geometry and position of respective components of the screwing element 22, to allow the abutment of the attachment surface 52 and one of the inner surfaces 38 in two or more of the abutment sub-regions, and to allow secure clamping of the cutting insert 20 in the insert pocket 18.

For example, in some embodiments the attachment surface 52 may be generally flat, or alternatively concave, or have any convenient shape, e.g., to abut the inner surface 38 at the at least two distinct abutment sub-regions. In some embodiments the inner surface 38 is flat, whereas the attachment surface 52 is slightly concave, or vice versa, to thereby allow abutment therebetween, in two distinct of the distinct abutment sub-regions.

In other embodiments, both the attachment surface 52 and the inner surface 38 are flat, and thus abut over a continuous portion of the abutment region 68, i.e., abut over an entire abutment surface. Other embodiments may include other convenient schemes to form the at least two distinct abutment sub-regions between the attachment surface 52 and the inner surface.

Due to the fastening of the screw 30 and due to external forces exerted during operation of the cutting tool 10, the inner surface 38 and the attachment surface 52 exert a force on one another. Abutment of the inner surface 38 and the attachment surface 52 in the two or more abutment sub-regions allows, for example, the exerted force to be divided between the two or more abutment sub-regions, and thereby to decrease pressure on the abutment region 68. Thus, the inner surface 38 and the attachment surface 52 may be durable to withstand application of a relatively large force exerted thereon.

Upon positioning of the cutting insert 20 in the insert pocket 18 and fastening of the screw 30, the attachment surface 52 pushes the inner surface, and thus pushes the cutting insert 20 as a whole against the insert pocket 18, clamping a plurality of surfaces of the cutting insert 20 against a plurality of respective walls of the insert pocket 18, as described in more detail below. Similarly, with reference to FIG. 5A and, upon fastening of the clamping screw 40, the under face 70 abuts the inner surface 38 and pushes the inner surface 38 and thus pushes the cutting insert 20 as a whole against a plurality of walls of the insert pocket 18, to securely clamp the cutting insert 20 therein.

In some embodiments, respective longitudinal axes, of the clamping screw 40, of the threaded bore 56, and of the grooved portion 62, coaxially align along a common axis T, referred to herein as the T-axis, having a positive direction defined from the threaded bore 56 toward the screw-head 42. The positive T-axis may form an acute angle with the positive Z-axis. Additionally, a projection of the T-axis on the X-Y plane may coincide with the S-axis. Thus, upon fastening of the clamping screw 40, under face 70 pushes the cutting insert 20 downward and inward, i.e., pushes the bottom surface 28, the major side surface 46, and a minor side surface 72—against the bottom wall 64, the major side wall, and a minor side wall 74 of the insert pocket 18, respectively, to securely fasten the cutting insert 20 in the insert pocket 18, e.g., as similarly described in more detail below, with reference to other embodiments.

In some embodiments, respective longitudinal axes, of the threaded bore 56, of the inner thread 50, and of the screw 30, may coaxially align and coincide with the S-axis. The attachment surface 52, e.g., if having a planar shape, may form an acute angle a with the negative S-axis. For example, the acute angle a may be approximately 75 degrees, or approximately 72 degrees, or no more than 80 degrees, or other convenient acute angles. Additionally, the positive S-axis may form an obtuse angle $\beta$ with the positive X-axis. For example, the obtuse angle $\beta$ may be approximately 97.5 degrees, or approximately 102 degrees, or more than 90 degrees, or other convenient angles.

Upon positioning of the cutting insert 20 in the insert pocket 18 and fastening of the screw 30, a fastening force is exerted, securing the cutting insert 20 in the insert pocket 18. Due to the geometry of the cutting portion 16, and specifically, due to the formation of the acute angle α between the attachment surface 52 and the negative S-axis, and due to formation of the obtuse angle β between the positive S-axis and the positive X-axis, the fastening force has force components in the negative S-axis direction, and in the negative Z-axis direction.

Thus, the force components of the fastening force push the cutting insert 20 inwards and downwards, against a plurality of walls of the insert pocket 18, to securely clamp the cutting insert 20 therein. For example, the force components of the fastening force press the major side surface 46, the minor side surface 72, and the bottom surface 28, against the major side wall, the minor side wall 74, and the bottom wall 64, respectively, and thus securely fasten and position the cutting insert 20 in the insert pocket 18. The cutting insert 20 therefore remains securely clamped and positioned in the insert pocket 18, e.g., able to withstand exertion of external forces thereon, e.g., during the cutting operation.

Figure 7B:
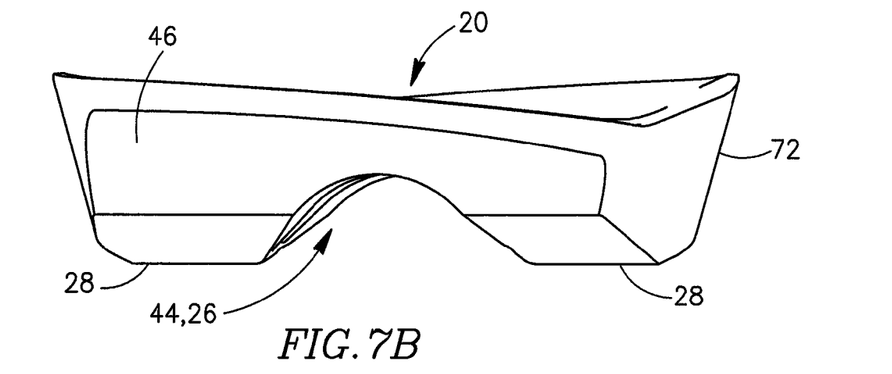
FIG. 7B is a side view of the cutting insert of FIG. 7A.
Figure 7C:
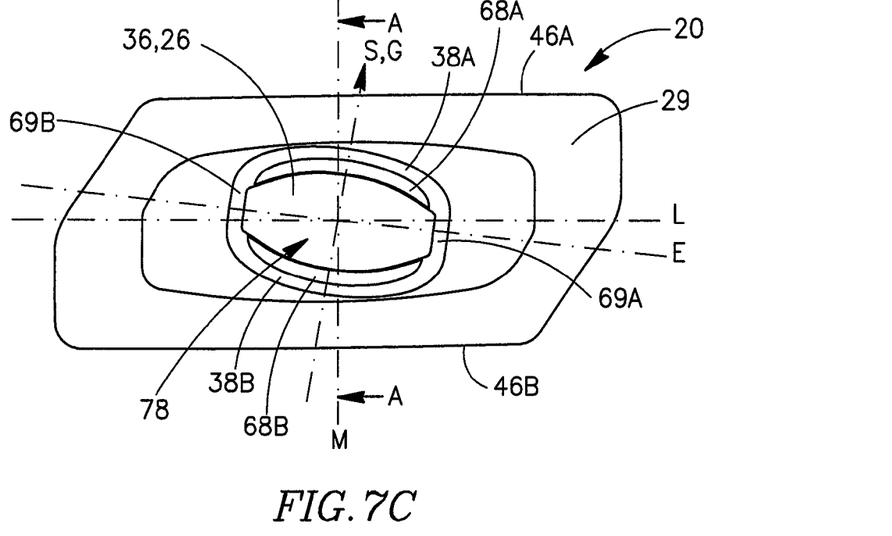
FIG. 7C is a top view of the cutting insert of FIG. 7A.
Figure 7D:
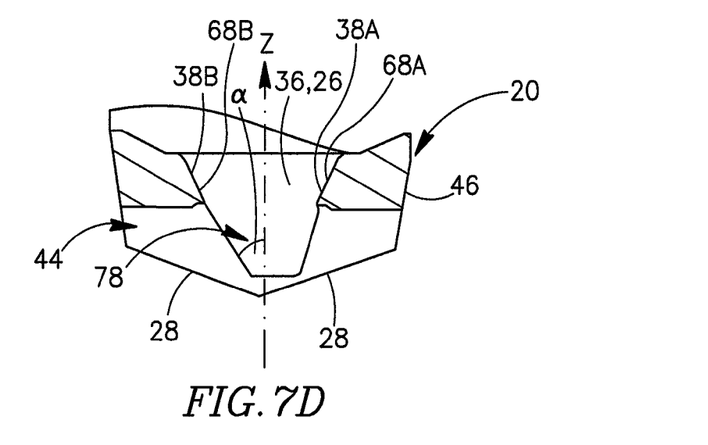
FIG. 7D is a cross section of the cutting insert of FIG. 7A taken along the line A-A.

Reference is now made to FIG. 7B-7D, which show several views of the cutting insert 20 according to embodiments of the present invention. The longitudinal median plane L of the cutting insert 20 is defined as a median plane of the cutting insert 20 extending through a longitudinal axis of the cutting insert 20, and generally parallel to the major side surfaces 46. The lateral median plane M of the cutting insert 20 is defined as a median plane of the cutting insert 20 extending through a lateral axis of the cutting insert 20, and generally perpendicular to the major side surfaces 46.

As described above, in some embodiments the recess 26 securely accommodates therein one or more portions of the screwing element 22. In some embodiments, for example, but not limited in this respect, the recess 26 comprises a groove 44 and the groove 44 accommodates therein at least a region of the base portion, e.g., at least a top region 24 of base portion. In other embodiments, the recess 26 only includes the shaped hole 36, and therefore the protruding portion 34 is the only portion of the screwing element 22 to be accommodated in the recess 26.

In some embodiments, for example, the groove 44 may be located substantially in the middle region 78 of the bottom surface 28. The groove 44 may extend longitudinally between the two major side surfaces 46, and has a longitudinal axis referred herein as the G-axis. The G-axis may coincide with the S-axis. The groove 44 may have a generally half-cylindrical shape, or a shape of a portion of a cylinder. In some embodiments, the groove 44 may have an elliptical cross section, or an arched cross section. The groove 44 may alternatively have other convenient shapes, to securely accommodate therein the top region 24 of the screwing element 22, e.g., to accommodate therein the top region 24 of the sleeve 32.

The geometry of the cutting insert 20, and specifically, the formation of the groove 44 and the accommodation of the base portion 48 therein, allows the height h to be relatively small, and still allow the attachment surface 52 to securely clamp the cutting insert 20 in the insert pocket 18. This may result in the protruding portion 34 being relatively durable, i.e., to be able to withstand a relatively large forces without breaking and without failing to securely clamp the cutting insert 20 in position. This is so, for example, since even a large force exerted on the protruding portion 34 results in a relatively small torque exerted thereon, due to the height h being relatively small. In some embodiments, for example, the height h may be smaller than the thickness of the cutting insert 20, e.g., may be less than half the thickness of the cutting insert 20, or be approximately 45 percent the thickness of the cutting insert 20, or be no more than 40 percent the thickness of the cutting insert 20, or the like.

In some embodiments, for example, the shaped hole 36 extends between a substantially middle region 78 of the bottom surface 28, toward the top surface 29. The shaped hole 36 extends to, and opens out to the top surface 29, and thus forms an aperture in the top surface 29. This may facilitate manufacturing of the cutting insert 20. In other embodiments, the shaped hole 36 extends from the bottom surface 28 and toward the top surface 29, and is confined by the top surface, and thus maintains the top surface imperforated.

In some embodiments, the shaped hole has a non-cylindrical horizontal cross-section. In some embodiments a cross section of shaped hole 36 perpendicular to both the lateral and the longitudinal median planes M and L, respectively, may have an elongated shape extending over an elongated axis referred to herein as the E-axis. The E-axis is transverse to the S-axis. In some embodiments, in a top view of the cutting insert 20, the hole 36 has an elongated shape extending along the E-axis.

In some embodiments, e.g., in which the inner surfaces 38 are planar, each of the two inner surfaces 38 may form an acute non-zero angle, e.g., the acute angle a, with the longitudinal median plane of the shaped hole 36. Additionally, an intersection of the lateral median plane of the shaped hole 36 with the horizontal cross section thereof may be parallel to, or coincide with the S-axis. This allows matching surface-abutment between the abutting inner surface 38 and attachment surface 52, and thereby allows secure clamping of matching cutting insert 20 in matching insert pocket 18, as described above. In other embodiments, other convenient angles between various sections of matching cutting insert 20 may be formed.

In all the foregoing embodiments, however, the recess 26 is shaped to receive, via the bottom surface 28, the screwing element 22 for applying the fastening force against at least one of the abutment regions.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A single-sided cutting insert comprising:
    a bottom surface;
    a top surface;
    a peripheral side surface extending between the top and bottom surface, the peripheral side surface comprising two opposing major side surfaces and two opposing minor side surfaces;
    a longitudinal median plane (L) intersecting the two minor side surfaces and the top and bottom surfaces;
    a lateral median plane (M) intersecting the two major side surfaces and the top and bottom surfaces; and
    a recess formed in the bottom surface and comprising a hole which extends towards the top surface; wherein:
    the hole has a first inner surface comprising a first abutment region at least substantially on a first side of the longitudinal median plane (L);
    the hole has a second inner surface comprising a second abutment region at least substantially on a second side of the longitudinal median plane (L);

the first and second abutment regions face in opposite directions;

the recess is shaped to receive, via the bottom surface, a screwing element for applying a fastening force against at least one of the first and second abutment regions; and the recess comprises a single groove extending between the two major side surfaces and along the bottom surface.

2. The single-sided cutting insert according to claim 1, wherein:

the first and second abutment regions are spaced apart from one another by non-abutment regions found in the hole.

3. The single-sided cutting insert according to claim, 1 wherein:

the groove has an arched shape, as seen in a side view of the cutting insert.

4. The single-sided cutting insert according to claim 1, wherein:

the hole opens out to the top surface, thereby forming an aperture in the top surface.

5. The single-sided cutting insert according to claim 1, wherein:

in a top view of the cutting insert, the hole has an elongated shape extending along an elongated axis.

6. The single-sided cutting insert according to claim 5, wherein:

the elongated axis of the hole forms a first non-zero acute angle with the longitudinal median plane (L).

7. The single-sided cutting insert according to claim 1, wherein:

the first abutment region comprises at least two distinct abutment sub-regions; and the second abutment region comprises at least two distinct abutment sub-regions.

8. The single-sided cutting insert according to claim 1, wherein:

the recess is configured and dimensioned to accommodate a protruding portion of a screwing element, for abutment of an attachment surface of the protruding portion with one of the first and second abutment surfaces.

9. A cutting tool having at least one cutting portion, the at least one cutting portion comprising:

an insert pocket having a major side wall provided with a threaded bore, and a bottom wall having a grooved portion formed therein; and a cutting insert comprising a bottom surface, a top surface, and a peripheral side surface extending therebetween, the peripheral side surface comprising two opposing major side surfaces and two opposing minor side surfaces; and a recess formed in the bottom surface and comprising a hole which extends towards the top surface; wherein:

the hole has a first inner surface comprising a first abutment region at least substantially on a first side of a longitudinal median plane (L) intersecting the two minor side surfaces and the top and bottom surfaces;

the hole has a second inner surface comprising a second abutment region at least substantially on a second side of the longitudinal median plane (L);

the first and second abutment regions face in opposite directions; and the recess is shaped to receive, via the bottom surface, a screwing element for applying a fastening force against at least one of the first and second abutment regions; and a screwing element releasably retaining the cutting insert in the insert pocket with a bottom region of the screwing element accommodated in the grooved portion of the bottom wall of the insert pocket, the screwing element including an attachment surface in abutment with at least one of the first and second abutment regions.

10. The cutting tool according to claim 9, wherein:

the attachment surface is in abutment with at least two distinct abutment sub-regions.

11. The cutting tool according to claim 9, wherein:

the screwing element comprises a clamping screw having a screw head the clamping screw is received into the threaded bore of the insert pocket; and the screw head has an under face which serves as the attachment surface and abuts at least one of the first and second abutment regions.

12. A cutting tool having at least one cutting portion, the at least one cutting portion comprising:

an insert pocket having a major side wall provided with a threaded bore; and a cutting insert comprising a bottom surface, a top surface, and a peripheral side surface extending therebetween, the peripheral side surface comprising two opposing major side surfaces and two opposing minor side surfaces; and a recess formed in the bottom surface and comprising a hole which extends towards the top surface; wherein:

the hole has a first inner surface comprising a first abutment region at least substantially on a first side of a longitudinal median plane (L) intersecting the two minor side surfaces and the top and bottom surfaces;

the hole has a second inner surface comprising a second abutment region at least substantially on a second side of the longitudinal median plane (L);

the first and second abutment regions face in opposite directions; and the recess is shaped to receive, via the bottom surface, a screwing element for applying a fastening force against at least one of the first and second abutment regions; and a screwing element releasably retaining the cutting insert in the insert pocket, the screwing element including an attachment surface in abutment with at least one of the first and second abutment regions, wherein:

the screwing element comprises a sleeve having an inner thread and a screw;

the sleeve is mounted on the screw; and the attachment surface is provided on the sleeve.

13. The cutting tool according to claim 12, wherein:

the screw comprises a differential screw having first and second threads having different. threading directions to allow simultaneous receiving of the first thread into the threaded bore and the second thread into the inner thread.

14. The cutting tool according to claim 9, wherein:

the screwing element comprises a base portion screwably received in the threaded bore of the insert pocket; and a protruding portion extending into the recess of the cutting insert, the attachment surface being formed on the protruding portion.

15. The cutting tool according to claim 14, wherein:

the protruding portion has a height of no more than half the thickness of the cutting insert.

16. A cutting tool having at least one cutting portion, the at least one cutting portion comprising:

an insert pocket having a major side wall provided with a threaded bore and a bottom wall provided with a grooved portion;

a cutting insert comprising a bottom surface, a top surface, and a peripheral side surface extending therebetween, the peripheral side surface comprising two opposing major side surfaces and two opposing minor side surfaces; and a recess formed in the bottom surface, the recess having formed therein at least one abutment region; and a screwing element received into the recess via the bottom surface and releasably retaining the cutting insert in the insert pocket, the screwing element comprising:

a bottom region at least partially occupying the grooved portion formed in the bottom wall;

a threaded portion engaging the threaded bore provided in the major side wall; and an attachment surface in abutment with at the least one abutment region formed in the recess of the cutting insert.

17. The cutting tool according to claim 16, wherein:

the attachment surface is in abutment with at least two distinct abutment sub-regions.

\* \* \* \* \*